Dec. 20, 1955     T. B. BOGERT     2,727,681
CARRIAGE MOUNTED FUNCTION CONTROL MECHANISM

Filed Feb. 19, 1952     3 Sheets-Sheet 1

Inventor
Thure Bernhard Bogert
By Henderoth, Lindt & Ponack
Attorneys

Inventor
Thure Bernhard Bogert
By
Henderoth, Lind + Ponack
Attorneys

Dec. 20, 1955  T. B. BOGERT  2,727,681
CARRIAGE MOUNTED FUNCTION CONTROL MECHANISM
Filed Feb. 19, 1952  3 Sheets-Sheet 3
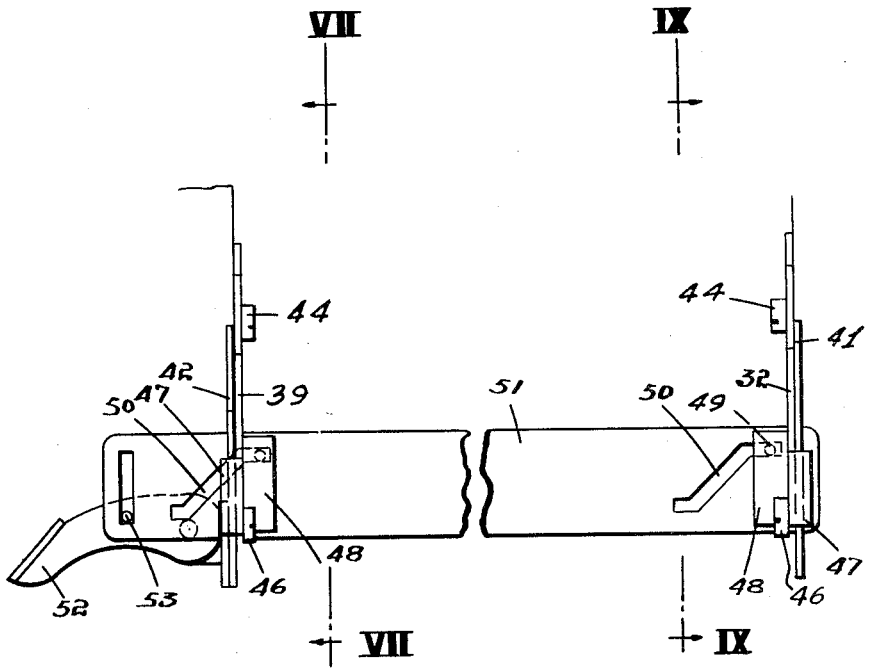
FIG. 7
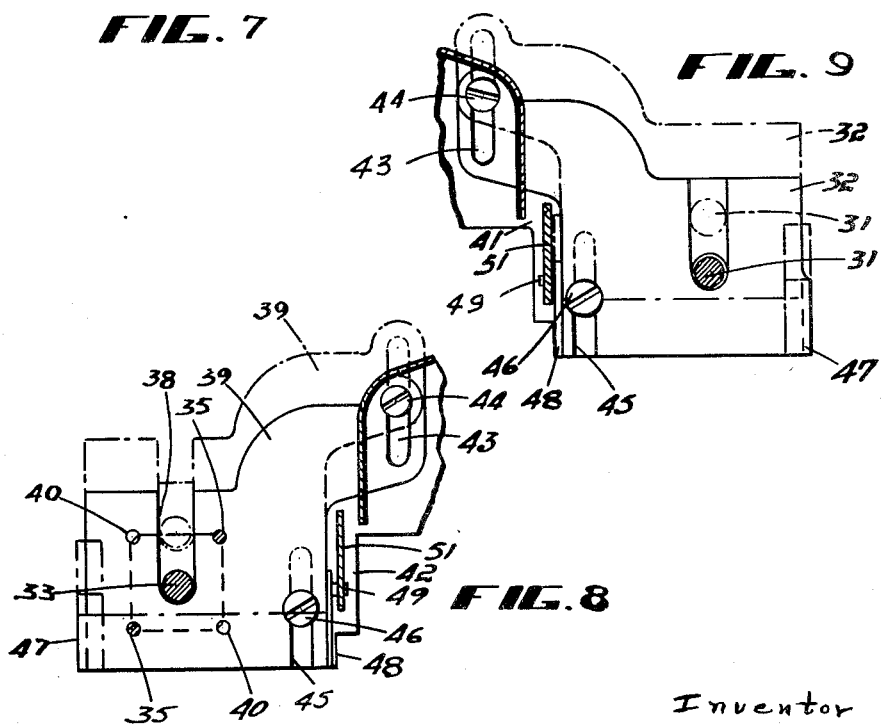
FIG. 9
FIG. 8
Inventor
Thure Bernhard Bogert
By
Thenderoth, Lind & Ponack
Attorneys

United States Patent Office 2,727,681
Patented Dec. 20, 1955

2,727,681

CARRIAGE MOUNTED FUNCTION CONTROL MECHANISM

Thure Bernhard Bogert, Malmo, Sweden, assignor to Aktiebolaget Addo, Malmo, Sweden, a corporation of Sweden Application February 19, 1952, Serial No. 272,451

4 Claims. (Cl. 235—60.5)

The present invention relates to an impulse-giving device for automatic control of the movement of the carriage and selection of the mode of operation of accounting machines and the like having a displaceable carriage and having a supporting means formed as a parallelepiped bar or the like and journalled on the carriage, said supporting means being arranged to support impulse means necessary both for the control of the movement of the carriage and for selecting the mode of operation of the machine and operating means for displacing the carriage and acting on the machine operation, said impulse means being preferably removably fixed to the supporting means.

The present invention has the object of producing an impulse-giving device of the kind in question which facilitates passing swiftly and very simply from one control sequence or program to another. The invention is characterized by the feature that the side faces of the supporting means are each adapted to support one set of impulse means necessary for automatically producing a complete operating program.

The invention will be more closely described in the following, reference being had to the accompanying drawings showing an embodiment of the invention.

Fig. 7 shows from the rear a mounting means for the holding bar, while irrelevant parts have been left out.

Figs. 8 and 9 show sections on lines VIII—VIII and IX—IX, respectively, of Fig. 7.

Figure 1:
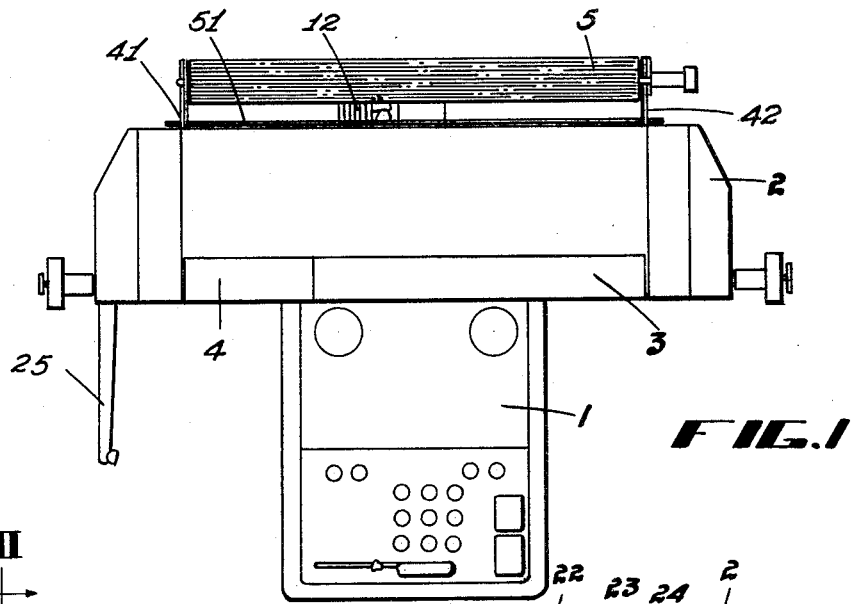
Fig. 1 shows an accounting machine having a device according to the invention, as seen from above.

The machine 1 shown in the drawings is an accounting machine having a carriage 2 provided with a platen 3 for supporting an account card (not shown) to be provided with ciphers in various columns and a platen 4 for supporting a control slip (not shown) on which the machine is to print ciphers or signs in order to show whether the entry of ciphers in the account card has been made correctly. All this is well known in connection with accounting machines. During the entry of items in the account card the carriage 2 of the machine is to be displaced automatically from column to column, the steps of displacement having to be of different length depending on the width of the columns of the account card and on whether the carriage is to skip one or more columns on the account card. Besides it is desired that the machine shall automatically perform certain accounting operations after each step of displacement of the carriage 2; these operations may be different in the various displacement steps. All this depends on the special accounting which is to be done on the account card in question. These various displacement steps of the carriage 2 and various accounting operations in the various positions of displacement of the carriage are determined by means of stops on a holder on the carriage which is to be described below. Sometimes it is desirable to be able to adjust the machine swiftly in order to change the sizes of the steps of displacement of the carriage and in order to change those accounting operations by the machine which are obtained in the various steps of displacement of the carriage, and for this purpose the holder of the stops according to the present invention is constructed in a special manner.

Figure 2:
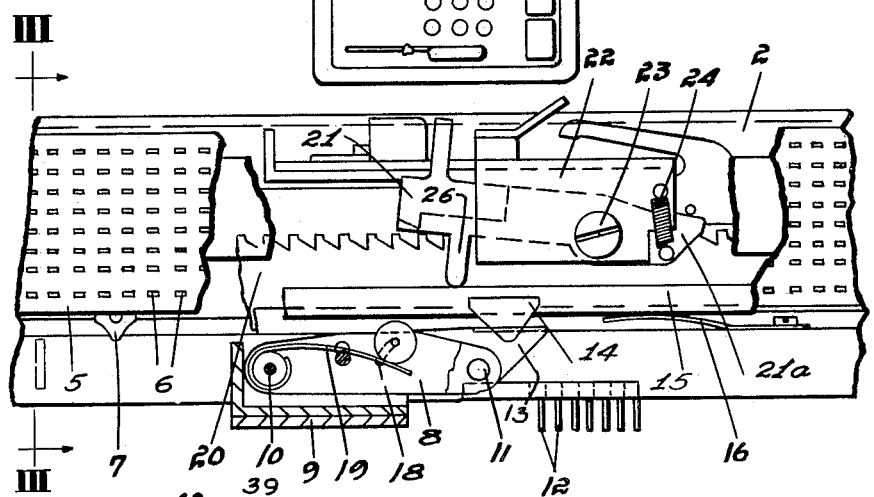
Fig. 2 shows a portion of the machine from the rear and partly in section, certain parts having been broken away for the purpose of illustrating the parts lying behind.

In the embodiment shown the holder of the stops is constituted by a bar 5 which is cross-sectionally square and journalled in a manner described in the following at the rear of the carriage 2 in a horizontal position and in parallel with the direction of displacement of the carriage. The side walls of the bar consist of plates, which are provided in this case with eight longitudinal rows having equally spaced apertures 6 for placing tabs or stops 7 in desired positions for the purpose of reaching a desired mode of operation by the machine. In the drawings, the stops 7 have the form of yokes (Fig. 2), whose legs can be resiliently fixed in two apertures 6 which are situated adjacent one another in the same longitudinal row on the bar 5.

The stops 7 are adapted to cooperate with swingable arms 8 mounted on a bracket 9 projecting from a stationary part of the machine below the bar 5, in such a way that the arms 8 are each located below one longitudinal row of apertures 6 on the bottom side of the bar 5. The arms 8 consist of two lateral pieces rigidly connected with one another and pivoted at one end on a common shaft 10 on the bracket 9 and having at the other end a transverse pin 11 resting on the angularly bent end of an operating means 12 projecting from the stationary part of the carriage. In the shown embodiment there are eight arms 8 and seven operating means 12 which cooperate with the rearmost seven arms 8 for adjusting the machine to various accounting operations, such as addition, subtraction, total taking, printing, non-printing, sub-total taking, addition in various counters etc. The arm 8 which is located nearest the stationary part of the machine does not, however, cooperate with any operating means 12 but has a bent projection 13 gripping over a projection 14 on a tabulation bail 15 for displacement or tabulation of the carriage 2 in a manner described in the following. The arms 8 are held in a raised position by operating means 12 and a leaf spring 16, respectively (Fig. 2), which tend to hold the tabulation bail 15 in a raised position. At one place between the pin 11 and the shaft 10 each arm 8 has a roller 17 which is journalled by means of a trunnion in two arcuate grooves 18 in the lateral pieces of each arm 8. The arcuate grooves have their upper ends directed in the direction of displacement of the carriage 2 at a tabulation movement, and a spring 19 tends to hold each roller 17 in a raised position with the trunnion in the upper end of the grooves 18, in which position the roller is located in the path of motion for stops 7 in the row of apertures 6 on the bottom side of the bar 5 which corresponds to the respective arm 8. When the carriage 2 performs a tabulation movement, a stop 7 arriving at the area of the respective roller 17 will thus press down the corresponding arm 8, so that said arm will press down the corresponding operating means 12 and the tabulation bail 15, respectively. On the other hand, when the carriage is returned in the opposite direction the stops 7 will admittedly hit the rollers 17, but these latter can then yield without actuation by the operating means 12 and the tabulation bail 15, respectively, since the trunnions of the rollers slide downwards in the arcuate grooves 19 against the action of the weak springs 19. Such yielding by the rollers 17 is impossible when the carriage moves in the opposite direction, since the trunnions of the rollers will then support themselves against the upper ends of the grooves 18 and press the arms 8 downwards.

In the embodiment shown in the drawing, the carriage 2 is displaced in the direction of tabulation by a cord (not shown) which is placed under spring tension in a known manner, and all positions of tabulation of the carriage are determined by a rack 20 which has one tooth for each aperture 6 in a longitudinal row of apertures on the bar 5. The rack 20 is arranged on the stationary part of the machine, and a latch 21 is arranged on the carriage 2 for engagement with the rack 20 in order to keep the carriage 2 in a desired position of tabulation. The latch 21 is pivotally mounted on a plate 22 on the carriage 2 by means of a pin 23 screwed into the plate and has an end 21a projecting beyond the pin 23, which is actuated by a spring 24 tending to hold the latch 21 in engagement with the rack 20. The latch 21 can be raised (in a manner which is irrelevant to the invention) from the rack 20 by means of a pair of carriage returning handles 25 (which are arranged one above the other, so that only one is seen in Fig. 1). Besides, the latch 21 can be raised from the rack 20 by means of the tabulation bail 15 due to the fact that the latch has a downwardly directed projection 26 bent over the bail 15, and the leaf spring 16 swinging the bail 15 upwards is sufficiently strong for overcoming the spring 24, so that the bail 15 can keep the latch 21 out of engagement with the rack. When during the tabulation movement of the carriage a stop 7 hits the roller 17 on the arm 8 located nearest the stationary part of the machine, the bail 15 raised by the spring 16 is swung downwards by the arm 8, which actuates the bail by means of the projections 13, 14, so that the spring 24 can swing the latch 21 into engagement with the rack 20, whereby the carriage is stopped in the desired tabulation position.

As the stops arranged by the carriage in this tabulation position hold the corresponding arms 8 pressed down as long as the carriage remains in the tabulation position in question, the bail 15 is kept pressed down, so that it cannot be used for releasing the latch 21 when the carriage is to perform the next tabulation movement. In order to start the tabulation movement a second tabulation bail 27 is consequently used, said bail extending immediately inside of the bail 15 and being journalled at the ends of its legs on the same trunnions as the bail 15 (see Fig. 4). The bail 27 extends, like the bail 15, below the path of the projections 26 of the latch 21, so that the latch 21 can be raised away from the rack 20 by swinging of the bail 27 upwards. Such swinging of the bail 27 is brought about automatically at the end of an accounting operation by the machine due to the fact that some suitable driving means in the machine swings a catch 28 upwards, the end of said catch raising the bail 27 (see Fig. 3). As soon as the latch 21 has been lifted away from the rack 20, so that the carriage has begun its tabulation movement under the action of its spring-loaded cord, the bail 15 is raised, and the catch 28 and the bail 27 are lowered, so that the latch is kept raised from the rack solely by the bail 15, and the stopping of the carriage in a desired position can take place due to the fact that the subsequent tabulation stop 7 on the bar 5 hits the arm 8 provided with the projection 13 and lowers the bail 15 in a manner previously described so that the latch 21 engages with the rack 20.

The holding bar 5 (shown in the drawings) for the stops 7 can receive stops on all four sides, and of these stops only those temporarily facing the arm 8 are active.

Since the stops on the various sides of the bar can be arranged in an arbitrary manner, it is possible, by making the bar 5 rotatable, swiftly to adjust the machine in a simple manner for operation according to any one of four originally arbitrarily selected combinations of tabulation steps by the carriage and accounting operations performed in the respective tabulation position. The bar 5 could of course be arranged on the carriage 2 in such a way that it could be easily removed, turned and once more secured to the carriage, but in the present case the bar 5 has been journalled on the carriage, although it is simultaneously easy to remove in order to exchange it for another bar 5, if four combinations of tabulation steps and accounting operations in the respective steps are not sufficient. The bar can, however, also be made with more sides than four in such cases, and it is of course also possible to make the bar e. g. triangular, in such cases where the number of necessary combinations does not have to be as large as four. In any case, it is suitable to make the bar with sides cross-sectionally equally large, i. e. as a regular polygon.

Figures 5, 6:
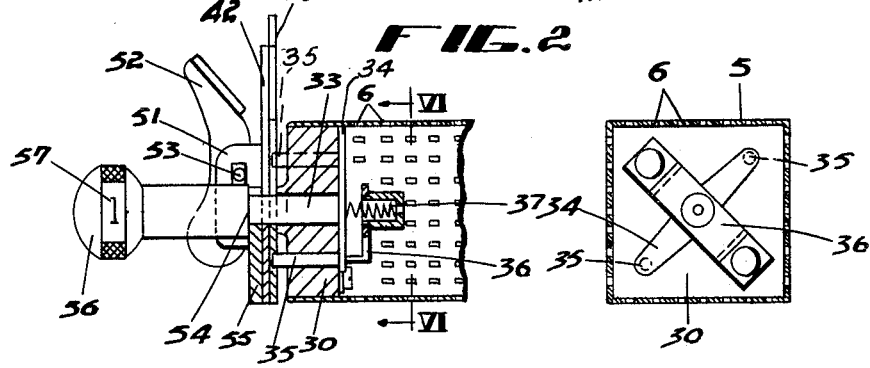
Fig. 5 shows a vertical section through one end of a holding bar forming part of the impulse-giving device and a mounting means for said end of the bar.
Fig. 6 shows a section on line VI—VI of Fig. 5.
Figure 3:
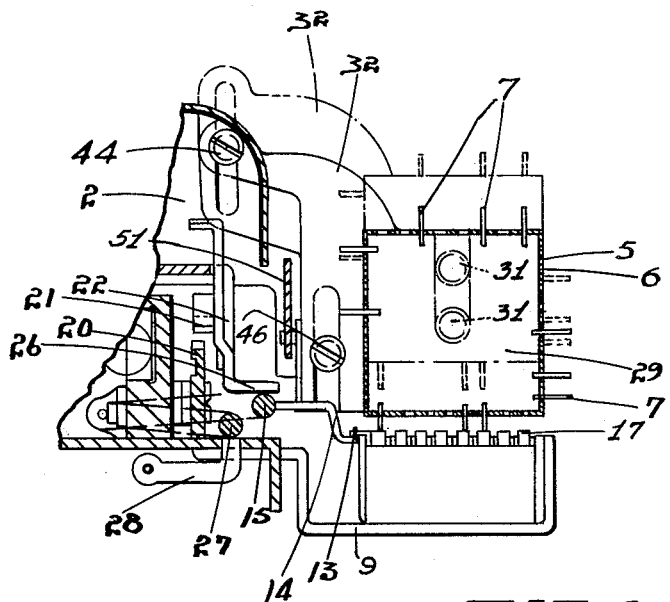
Fig. 3 shows a cross section approximately on line III—III of Fig. 2.
Figure 4:
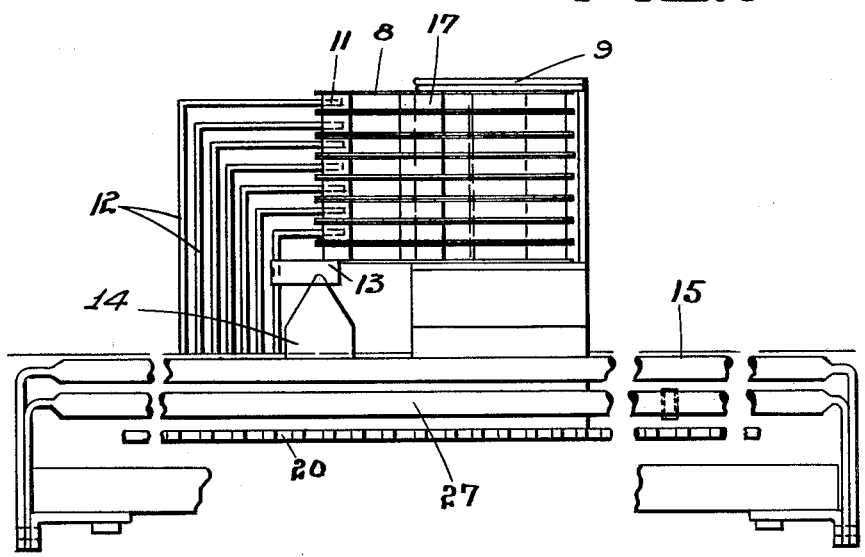
Fig. 4 shows a horizontal projection of certain operating means in the machine which are operated by the impulse-giving device according to the invention.

The plate-shaped side walls of the bar shown in the drawings are secured at each end to an end plate 29 and 30, respectively (Figs. 3, 5, 6). The end plate 29 supports centrally, i. e. at equally large distances from the side walls of the bar, a trunnion 31 projecting from the end wall, whose end is insertable into a hole in a bearing plate 32.

In the end wall 30 a pin 33 is displaceably mounted, and the inner end of said pin is connected with a cross-piece 34 supporting at the end pins 35 projecting through the end wall 30. The pin 33 is actuated by a pressure spring 37 inserted between said pin and a yoke 36 bridging the cross-piece 34, said pressure spring thus tending to keep the pin 33 projecting as far as possible through the end wall 30 with the cross-piece 34 in contact with the inner side of the end wall. The pin 33 is journaled in an upwardly open slot 38 in a bearing plate 39 and the bar 5 is retained in an adjusted position of rotation due to the fact that the pins 35 project into the pair in question of four apertures 40 in the bearing plate 39 each arranged in the corner of a square. When the bar 5 is to be rotated in such a way that another side with stops 7 will face downwards for cooperation with the arms 8, the pin 33 is pushed inwards into the bar against the action of the spring 37, so that the locking pins 35 arranged on the cross-piece 34 are moved out of the pair in question of holes 40 in the bearing plate 39, whereupon the bar 5 can be rotated freely to its new position, in which the locking pins 35 after releasing the pin 33 engage with the pair of holes 40, located opposite the pins, in the bearing plate 39, so that the bar will become locked in its new position of rotation.

In order that the bar may be rotated freely without being prevented by the arms 8, the bar must be raised somewhat from the arms 8 so that the corners of the bar can pass said arms. The bearing plates 32 and 39 of the bar are consequently arranged on supporting plates 41 and 42, respectively, in such a manner that they can be raised and lowered, and said supporting plates are secured to the carriage 2. The two bearing plates are alike except for the fact that the bearing plate 32 has a hole for the pin 31 of the bar 5, whereas the bearing plate 39 has an upwardly open slot 38 for the trunnion 33 of the bar and that the bearing plate 39 has apertures 40 not existing on the bearing plate 32. At the top they are provided with a vertical slot 43 through which a screw 44 is screwed into the respective supporting plate 41, 42. At the bottom there is a downwardly open slot 45 through which a screw 46 is screwed into the respective supporting plate 41, 42. Besides, a flap 47 at the lower end of the rearwardly facing vertical lateral edge of each bearing plate 32, 39 is bent laterally over the rearwardly facing vertical lateral edge of the respective supporting plate 41, 42. Through this device the bearing plates 32 and 39 are guided safely without clamping during the displacement upwards and downwards by means of the following mechanism. Each bearing plate 32, 39 has a lug 48 at the vertical side wall which is located nearest the carriage, said lug being bent in parallel with the direction of movement of the carriage and supporting a pin 49 which engages with an inclined groove 50 in a slide bar 51, said groove being provided with horizontal end portions and said bar being displaceably mounted in the supporting plates 41 and 42. The bar can be displaced back and forth by means of a swingable handle arm 52 which is located on the supporting plate 42 and has a pin 53 engaging in a vertical slot at one end of the bar 51.

When the handle 52 is swung downwardly to the position according to Fig. 7, the pins 49 are located in the upper horizontal end portions of the grooves 50, so that the bearing plates 32 and 39 are raised to a position for admitting of rotation of the bar without hindrance by the arms 8 (see also the dashed and dotted position of the bar in Fig. 3). When the handle 52 is swung upwards to the position in Fig. 5, the bar 51 is swung to the right with respect to Fig. 7, so that the pins 49 slide down along the inclined portions of the grooves 50 to the horizontal lower end portions of the grooves, the bearing plates 32 and 39 being lowered to that position in which the bar 5 is located in its position of operation for cooperation with the arms 8 (see also the position shown in continuous lines in Fig. 3).

In order to prevent possible damage if a careless operator tries to turn the bar 5 while it is in its lowered position of operation, the projecting end of the pin 33 has a greater diameter immediately beyond the supporting plate 42 so that a shoulder 54 is formed, and on the side facing away from the end plate 30 of the bar 5 the supporting plate 42 is provided with a plate 55 adjacent its slot for the pin 33, which slot corresponds to the slot 38 in the bearing plate 39, said plate 55 preventing, by serving as an abutment for the shoulder 54 of the pin 33, the axial displacement of the pin 33 which is necessary for turning the bar 5, when the bar 5 is in its lowered position of operation, said plate 55 having such a form and extension that it does not act as a hindrance to pushing the pin 33, when the bar 5 has been raised from the arm 8. Such a blocking of the bar 5 in the lowered position of operation can be brought about also in other ways, e. g. by making the grooves 50 inclined in the opposite direction, so that the handle is turned down, when the bar 5 is in its lowered position of operation; a handle 56 formed on the end of the pin 33 can be given such an angular form that, when in a downward position, the handle 52 abuts one side of the handle 56 and prevents this from being turned. The handle 56 is preferably provided with four planed surfaces 57 located in pairs opposite one another and numbered 1 to 4 in order that the operator may find out easily which side of the bar 5 is active at the moment.

The invention must not of course be considered as limited to the embodiment shown and described here, for several modifications can be resorted to within the scope of the inventive idea disclosed in the claims.

What I claim and desire to secure by Letters Patent is:

1. In an accounting machine having a carriage displaceable on a machine frame, an impulse-giving device for automatic control of the movement of the carriage and selection of the mode of operation of the machine, comprising a supporting bar having the cross-sectional shape of a regular polygon, bearing means mounting said bar for rotation around its longitudinal axis on the carriage with said axis extending in the direction of travel of the carriage, a plurality of control means mounted on the machine frame adjacent said bar in a row extending crosswise in relation to the longitudinal axis of said bar, said control means when actuated controlling the movement of the carriage and different operations of the machine, said bearing means supporting said bar for bodily movement between an effective position adjacent said control means and an ineffective position spaced from said control means for allowing rotation of said bar in the ineffective position without interference with said control means, means locking said bar in different positions of rotation in each of which a lateral side of said bar is in a working position facing the row of said control means, a plurality of impulse means on said bar arranged in a plurality of rows on each lateral side of said bar, each of the rows of said impulse means on each lateral side of said bar being alined with one of said control means when said lateral side is in the working position, said impulse means on the lateral side of said bar, located in the working position actuating said control means, when said bar is in the effective position, in different combinations during the movement of the carriage so as to produce a complete operating program of the machine automatically.

2. In an accounting machine having a carriage displaceable on a machine frame, an impulse-giving device for automatic control of the movement of the carriage and selection of the mode of operation of the machine, comprising a supporting bar having the cross-sectional shape of a regular polygon, bearing means mounting said bar for rotation around its longitudinal axis on the carriage with said axis extending in the direction of travel of the carriage, a plurality of control means mounted on the machine frame adjacent said bar in a row extending crosswise in relation to the longitudinal axis of said bar, said control means when actuated controlling the movement of the carriage and different operations of the machine, said bearing means supporting said bar for bodily movement between an effective position adjacent said control means and an ineffective position spaced from said control means for allowing rotation of said bar in the ineffective position without interference with said control means, means locking said bar in different positions of rotation in each of which a lateral side of said bar is in a working position facing the row of said control means, a plurality of mounting means on said bar arranged in a plurality of rows on each lateral side of said bar, each of the rows of said mounting means on each lateral side of said bar being alined with one of said control means when said lateral side is in the working position, a plurality of impulse means removably fixed in selected ones of said mounting means, said impulse means on the lateral side of said bar, located in the working position actuating said control means, when said bar is in the effective position, in different combinations during the movement of the carriage so as to produce a complete operating program of the machine automatically.

3. In an accounting machine having a carriage displaceable on a machine frame, an impulse-giving device for automatic control of the movement of the carriage and selection of the mode of operation of the machine, comprising a supporting bar having the cross-sectional shape of a regular polygon, said bar including two end plates having the outline of a regular polygon, and a plurality of substantially rectangular side walls each supported by one of the edges of each of said polygonal end plates and each having a plurality of rows of alined holes therein, supporting means for mounting said bar on the carriage with said symmetry axis extending in the direction of travel of the carriage, a plurality of control means mounted on the machine frame adjacent said bar in a row extending crosswise in relation to said symmetry axis, said control means when actuated controlling the movement of the carriage and different operations of the machine, said bar being engageable with said supporting means in different positions of rotation around said symmetry axis in each of which one of said side walls of said bar is in working position facing the row of said control means, and a plurality of impulse means on said side walls of said bar arranged in a portion of the holes in said plurality of rows on each of said side walls of said bar, each of the rows of said impulse means on each of said side walls being alined with one of said control means when said side wall is in the working position, said impulse means on the side wall of said bar located in the working position actuating said control means in different combinations during the movement of the carriage so as to produce a complete operating program of the machine automatically.

4. In an accounting machine having a carriage displaceable on a machine frame, an impulse-giving device for automatic control of the movement of the carriage and selection of the mode of operation of the machine, comprising a supporting bar having the cross-sectional shape of a regular polygon, said bar including two end plates having the outline of a regular polygon, a plurality of substantially rectangular side walls each supported by one of the edges of each of said polygonal end plates and each having a plurality of rows of alined holes therein, and trunnion means projecting from said end plates coaxially with the symmetry axis of said polygonal end plates, bearing means engaging said trunnion means for mounting said bar for rotation around its longitudinal axis on the carriage with said longitudinal axis extending in the direction of travel of the carriage, a plurality of control means mounted on the machine frame adjacent said bar in a row extending crosswise in relation to the longitudinal axis of said bar, said control means when actuated controlling the movement of the carriage and different operations of the machine, means locking said bar in different positions of rotation in each of which one of said side walls of said bar is in a working position facing the row of said control means, and a plurality of impulse means on said side walls of said bar arranged in a portion of the holes in said plurality of rows on each of said side walls of said bar, each of the rows of said impulse means on each of said side walls being alined with one of said control means when said side wall is in the working position, said impulse means on the side wall of said bar located in the working position actuating said control means in different combinations during the movement of the carriage so as to produce a complete operating program of the machine automatically.

References Cited in the file of this patent

UNITED STATES PATENTS

| | | |
|---|---|---|
| 1,817,451 | Gubelmann | Aug. 4, 1931 |
| 2,052,905 | Sturm | Sept. 1, 1936 |
| 2,214,897 | Bower | Sept. 17, 1940 |
| 2,229,765 | Bower | Jan. 28, 1941 |
| 2,284,803 | Crosman | June 2, 1942 |
| 2,492,887 | Rainey | Dec. 27, 1949 |
| 2,699,893 | Parker et al. | Jan. 18, 1955 |